United States Patent
Otsuka et al.

(10) Patent No.: US 9,150,698 B2
(45) Date of Patent: *Oct. 6, 2015

(54) COMPOSITE COMPOSITION OF INORGANIC OXIDE PARTICLES AND SILICONE RESIN, METHOD OF MANUFACTURING THE SAME, TRANSPARENT COMPOSITE, AND METHOD OF MANUFACTURING THE SAME

(71) Applicants: SUMITOMO OSAKA CEMENT CO., LTD., Chiyoda-ku, Tokyo (JP); Kyoto University, Kyoto-shi, Kyoto (JP)

(72) Inventors: Takeshi Otsuka, Tokyo (JP); Yoshiki Chujo, Kyoto (JP)

(73) Assignees: SUMITOMO OSAKA CEMENT CO., LTD., Tokyo (JP); KYOTO UNIVERSITY, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/576,945

(22) Filed: Dec. 19, 2014

(65) Prior Publication Data

US 2015/0105522 A1   Apr. 16, 2015

Related U.S. Application Data

(62) Division of application No. 13/809,560, filed as application No. PCT/JP2011/065871 on Jul. 12, 2011, now Pat. No. 9,006,354.

(30) Foreign Application Priority Data

Jul. 16, 2010 (JP) ................................. 2010-161990

(51) Int. Cl.

| | |
|---|---|
| C08L 83/04 | (2006.01) |
| C08G 77/44 | (2006.01) |
| C08K 9/06 | (2006.01) |
| C09C 3/10 | (2006.01) |
| C08G 77/398 | (2006.01) |
| B82Y 30/00 | (2011.01) |
| C01G 25/02 | (2006.01) |
| C09C 1/00 | (2006.01) |
| C09C 1/30 | (2006.01) |
| C09C 3/12 | (2006.01) |
| C08L 83/08 | (2006.01) |
| C09D 183/06 | (2006.01) |
| C08G 77/38 | (2006.01) |
| C08G 77/14 | (2006.01) |

(52) U.S. Cl.
CPC ............... *C08G 77/398* (2013.01); *B82Y 30/00* (2013.01); *C01G 25/02* (2013.01); *C08L 83/08* (2013.01); *C09C 1/00* (2013.01); *C09C 1/309* (2013.01); *C09C 1/3063* (2013.01); *C09C 1/3081* (2013.01); *C09C 3/12* (2013.01); *C09D 183/06* (2013.01); *C01P 2004/64* (2013.01); *C08G 77/14* (2013.01); *C08G 77/38* (2013.01)

(58) Field of Classification Search
None
See application file for complete search history.

(56) References Cited

U.S. PATENT DOCUMENTS

| | | | |
|---|---|---|---|
| 3,876,605 | A | 4/1975 | Itoh et al. |
| 2008/0150184 | A1 | 6/2008 | Chiruvolu et al. |
| 2009/0140284 | A1 | 6/2009 | Kurino et al. |
| 2009/0270555 | A1* | 10/2009 | Satoh et al. ................ 524/878 |

FOREIGN PATENT DOCUMENTS

| | | |
|---|---|---|
| JP | A-49-074787 | 7/1974 |
| JP | A-02-218723 | 8/1990 |
| JP | A-02218723 | 8/1990 |
| JP | A-04-036370 | 2/1992 |
| JP | A-07-196946 | 8/1995 |
| JP | A-2004-002887 | 1/2004 |
| JP | A-2005-097514 | 4/2005 |
| JP | A-2005-161111 | 6/2005 |
| JP | A-2006-316264 | 11/2006 |
| JP | A-2007-119617 | 5/2007 |
| JP | A-2008-120848 | 5/2008 |
| JP | A-2008-303299 | 12/2008 |
| JP | A-2009-024068 | 2/2009 |
| JP | A-2009-091380 | 4/2009 |
| JP | A-2010-095392 | 4/2010 |

OTHER PUBLICATIONS

Lohse, "In Interfacial Aspects of Multicomponent Polymer Materials", Nov. 1997 pp. 108 and 117.*
International Search Report for corresponding International Patent Application No. PCT/JP2011/065871 (mailed Nov. 1, 2011).
Japanese Office Action for corresponding Japanese Patent Application No. 2013-004878 (mailed Oct. 7, 2014).

* cited by examiner

*Primary Examiner* — Randy Gulakowski
*Assistant Examiner* — Christopher M Rodd
(74) *Attorney, Agent, or Firm* — Merchant & Gould P.C.

(57) ABSTRACT

A method of manufacturing a composite composition, having: bonding a dispersant to the surfaces of inorganic oxide particles to provide dispersibility in a hydrophobic solvent to the inorganic oxide particles, and then dispersing the inorganic oxide particles in a hydrophobic solvent; substituting the dispersant bonded to the surfaces of the inorganic oxide particles with a surface modifier, which is a polydimethylsiloxane-skeleton polymer having one functional group at one terminal end, in the hydrophobic solvent in which the organic oxide particles are dispersed to bond the functional group of the polydimethylsiloxane-skeleton polymer to the surfaces of the inorganic oxide particles; and conjugating a silicone resin and the inorganic oxide particles obtained in the previous step, wherein the surface thereof is modified by bonding the polydimethylsiloxane-skeleton polymer having one functional group at one terminal end thereof, to obtain a composite composition.

8 Claims, No Drawings

COMPOSITE COMPOSITION OF INORGANIC OXIDE PARTICLES AND SILICONE RESIN, METHOD OF MANUFACTURING THE SAME, TRANSPARENT COMPOSITE, AND METHOD OF MANUFACTURING THE SAME

This application is a divisional of U.S. patent application Ser. No. 13/809,560, filed 22 Apr. 2013, which is a U.S. National Stage Application under 35 U.S.C. §371 of International Patent Application No. PCT/JP2011/065871 filed 12 Jul. 2011, which claims the benefit of priority to Japanese Patent Application No. 2010-161990 filed 16 Jul. 2010, the disclosures of all of which are hereby incorporated by reference in their entireties. The International Application was published in Japanese on 19 Jan. 2012 as WO 2012/008441.

TECHNICAL FIELD

The present invention relates to a composite composition of inorganic oxide particles and a silicone resin, a method of manufacturing the same, a transparent composite, and a method of manufacturing the same.

BACKGROUND

Thus far, attempts have been made to improve the mechanical characteristics and the like of a resin by conjugating (mixing) an inorganic oxide, such as silica, as a filler and the resin. An ordinary method of conjugating the filler and the resin is a method in which a dispersion fluid containing the inorganic oxide dispersed in water or an organic solvent and the resin or resin raw material components are mixed. It is possible to manufacture metal oxide particle-conjugated plastic in which inorganic oxide particles are conjugated in a resin by mixing a dispersion fluid, the resin and the like by a variety of methods as a second phase (for example, refer to Patent Literature 1).

Among resins, silicone resins are used in a wide range from cosmetic materials or biomedical materials to electrical or electronic materials due to their excellent weather resistance characteristics, such as heat resistance and cold resistance, excellent electrical characteristics, low toxicity, and the like. In addition, recently, attention has been given to their transparency, and thus silicone resins have been used in optical members, such as a transparent sealing material and the like of a light-emitting diode. The optical members need to have properties, such as optical characteristics such as transparency and refractive index, mechanical characteristics such as hardness, and thermal stability such as heat resistance.

Generally, in a case in which a resin and an inorganic material such as an inorganic oxide are conjugated so as to obtain a composite, a variety of methods in which the compatibility between an inorganic material and a resin is improved by modifying the surface of the inorganic material, or previously conjugated raw materials are polymerized so as to obtain a composite are used.

For example, in a case in which inorganic oxide particles are conjugated with a hydrophobic resin, since the surfaces of the inorganic oxide particles are hydrophilic at all times, there was a problem that the inorganic oxide particles are not easily dispersed in the hydrophobic resin. Therefore, as a general solution, efforts have been made to make the surfaces of the inorganic oxide particles hydrophobic and increase the compatibility between the resin and the inorganic oxide particles by adding a surface modifier, such as an organic polymer dispersant, to the surfaces of the inorganic oxide particles.

However, in a case in which a silicone resin is selected as the resin, the silicone resin is highly hydrophobic. Therefore, it is difficult to make the surfaces of the inorganic oxide particles hydrophobic until the inorganic oxide particles are dissolved together with the silicone resin, which creates a problem that the silicone resin and the inorganic oxide particles are separated, and it is difficult to conjugate the silicone resin and the inorganic oxide particles.

Therefore, in order to conjugate the silicone resin and the inorganic oxide particles so as to obtain a conjugated plastic having favorable optical characteristics or thermal stability, for example, a composition in which zirconium oxide particles are conjugated with a hydroxyl group-containing polysiloxane in the presence of a chelating agent is proposed (Patent Literature 2).

In addition, a composition for coating light-emitting elements in which zirconium oxide particles and a polyfunctional polysiloxane are conjugated is also proposed (Patent Literature 3).

PRIOR ART DOCUMENTS

Patent Literature

Patent Literature 1: Japanese Unexamined Patent Publication No. 2005-161111
Patent Literature 2: Japanese Unexamined Patent Publication No. 2006-316264
Patent Literature 3: Japanese Unexamined Patent Publication No. 2009-091380

SUMMARY OF INVENTION

Problems to be Solved by the Invention

However, as described in Patent literature 2, in a case in which inorganic oxide particles and a silicone resin are dissolved in together by a chelating agent, there was a problem that the obtained composite composition or conjugated plastic is colored due to aging deterioration or thermal degradation which is caused particularly by modification of a chelating agent.

In addition, in a case in which a hydroxyl group-containing polysiloxane is used, since water is generated as the polysiloxane and the silicone resin are crosslinked with each other, there was a likelihood of a disadvantage that, in some cases, the phase separation of the inorganic oxide particles and the polysiloxane is caused due to water, or pores (micropores) or cracks (slit) are generated in the conjugated plastic due to dehydration-induced volume shrinkage.

Furthermore, as described in Patent literature 3, in a case in which a polyfunctional polysiloxane is used, there is a limitation in blending the inorganic oxide particles and the polysiloxane due to the compatibility thereof and the like, and, particularly, in a case in which the amount of the inorganic oxide particles is large, there was a problem that pores or cracks are significantly generated in the conjugated plastic.

Furthermore, in the respective Patent literature, since the particle diameter of the inorganic oxide particles is as large as 20 nm or more, there was a problem that the transparency deteriorates, and the conjugated plastic becomes opaque in some cases.

Means for Solving the Problem

The invention has been made in consideration of the above circumstances. That is, an object of the invention is to provide a composite composition of a silicone resin and inorganic oxide particles, a transparent composite and methods of manufacturing the same, wherein the composition has excellent optical characteristics, mechanical characteristics and thermal stability, and the silicone resin and the inorganic oxide particles are favorably conjugated, that is, the inorganic oxide particles are uniformly dispersed in and integrated with the silicone resin without any problem, so that phase separation does not occur, neither pores or cracks are generated, and coloration is prevented.

As a result of intensive studies to solve the above problems, the present inventors found that, when a specific method is used as a method of modifying the surfaces of inorganic oxide particles using a surface modifier composed of a polydimethylsiloxane-skeleton polymer having one functional group at one terminal end, the surface modifier is favorably introduced into the surfaces of the inorganic oxide particles, and, consequently, a favorable composite composition can be obtained. That is, it was found that, when a dispersant is bonded to the surfaces of the inorganic oxide particles in advance so as to provide dispersibility in a hydrophobic solvent, then, the inorganic oxide particles are dispersed in the hydrophobic solvent, and the dispersant is exchanged with the surface modifier composed of a polydimethylsiloxane-skeleton polymer having one functional group at one terminal end, resulting in the surface modifier composed of a polydimethylsiloxane-skeleton polymer having one functional group at one terminal end being favorably introduced into the surfaces of the inorganic oxide particles. In addition, it was found that a favorable composite composition can be obtained by conjugating inorganic oxide particles which include an introduced surface modifier using the above method and have an average dispersed particle diameter of 1 nm to 20 nm and a silicone resin.

Furthermore, it was found that, when the surfaces of inorganic oxide particles having an average dispersed particle diameter of 1 nm to 20 nm are modified using a surface modifier composed of a polydimethylsiloxane-skeleton polymer having one functional group at one terminal end, the compatibility of the inorganic oxide particles with respect to the silicone resin is significantly improved, and a favorable composite composition of the silicone resin and the inorganic oxide particles can be obtained. In addition, it was found that a transparent composite which is a conjugated plastic formed by curing the above composite composition, not only maintains the heat resistance and light resistance of the silicone resin but also obtains excellent optical characteristics, mechanical characteristics, and thermal stability due to conjugation with the inorganic oxide particles. The above finding leads to a completion of the invention.

That is, a first aspect of the invention is a method of manufacturing a composite composition, comprising:

bonding a dispersant to the surfaces of inorganic oxide particles to provide dispersibility in a hydrophobic solvent to the inorganic oxide particles, and then dispersing the inorganic oxide particles in a hydrophobic solvent;

substituting the dispersant bonded to the surfaces of the inorganic oxide particles and a surface modifier, which is a polydimethylsiloxane-skeleton polymer having one functional group at one terminal end thereof, in the hydrophobic solvent in which the organic oxide particles are dispersed to bond the functional group of the polydimethylsiloxane-skeleton polymer to the surfaces of the inorganic oxide particles; and conjugating a silicone resin and the inorganic oxide particles obtained in the previous step, wherein the surface thereof is modified by bonding the polydimethylsiloxane-skeleton polymer having one functional group at one terminal end thereof, to obtain a composite composition.

The surface modifier preferably includes one or two kind selected from monoglycidyl ether-terminated polydimethylsiloxane and monohydroxy ether-terminated polydimethylsiloxane.

The specific dispersant which is used to be bonded to the surfaces of the inorganic oxide particles is preferably an organic acid compound or an organic base compound.

The silicone resin is preferably a straight silicone resin or a modified silicone resin.

In addition, a second aspect of the invention is a composite composition containing inorganic oxide particles having an average dispersed particle diameter of 1 nm to 20 nm and a silicone resin, in which one functional group of a surface modifier composed of a polydimethylsiloxane-skeleton polymer having one functional group at one terminal end is bonded to the surfaces of the inorganic oxide particles to modify the surfaces.

A third aspect of the invention is a transparent composite, wherein inorganic oxide particles having an average dispersed particle diameter of 1 nm to 20 nm is dispersed in a silicone resin, and the surface of the inorganic oxide particle is modified by bonding one functional group of a surface modifier, which is a polydimethylsiloxane-skeleton polymer having one functional group at one terminal end thereof is bonded, to the surfaces of the inorganic oxide particles.

A fourth aspect of the invention is a method of manufacturing a transparent composite by molding and solidifying the composite composition of the invention.

Effects of Invention

According to the composite composition of the invention, since the composite composition contains inorganic oxide particles having an average dispersed particle diameter of 1 nm to 20 nm and a silicone resin, and the inorganic oxide particles are modified by bonding a functional group of a surface modifier which is a polydimethylsiloxane-skeleton polymer having the functional group at one terminal end thereof to the surfaces of the inorganic oxide particles, the compatibility between the inorganic oxide particles and the silicone resin is high, the conjugating properties of the two are excellent, and the coloration is prevented.

Furthermore, a transparent composite obtained by molding and solidifying the composite composition in a specific shape has a high compatibility between the inorganic oxide particles and the silicone resin. Therefore, since the inorganic oxide particles are favorably dispersed in the silicone resin without being agglomerated, it is possible to obtain a composite having excellent optical characteristics, mechanical characteristics and thermal stability.

In addition, since the inorganic oxide particles are made into nanoparticles having an average dispersed particle diameter of 1 nm to 20 nm, particularly, the transparency is excellent. Therefore, in the transparent composite obtained by molding and solidifying the composite composition in a specific shape, it is possible to obtain a composite having excellent transparency.

According to the method of manufacturing a composite composition of the invention, a specific dispersant is bonded to the surfaces of inorganic oxide particles in advance so as to provide dispersibility in a hydrophobic solvent, and then the inorganic oxide particles are dispersed in the hydrophobic solvent. Next, the specific dispersant bonded in advance to the surfaces of the inorganic oxide particles is substituted with a surface modifier composed of a polydimethylsiloxane-skeleton polymer having one functional group at one terminal end thereof in the hydrophobic solvent. Using the above steps, the functional group of the surface modifier which is a polydimethylsiloxane-skeleton polymer having one functional group at one terminal end thereof is bonded to the surfaces of the inorganic oxide particles. After that, the silicone resin and the inorganic oxide particles obtained in the above step are conjugated, wherein the inorganic oxide particles have been modified at the surfaces thereof through bonding of the polydimethylsiloxane-skeleton polymer having one functional group at one terminal end thereof. Since the above method is used, inorganic oxide particles which have an excellent compatibility with the silicone resin and substantially have no unreacted functional group of the surface modifier are obtained first, and then it is possible to conjugate the inorganic oxide particles and the silicone resin. Therefore, it is possible to obtain a composite which has excellent conjugating properties between the inorganic oxide particles and the silicone resin, and has excellent optical characteristics, mechanical characteristics, and thermal stability.

The transparent composite of the invention is a transparent composite having a specific shape in which inorganic oxide particles having an average dispersed particle diameter of 1 nm to 20 nm are dispersed in a silicone resin, and the surfaces of the inorganic oxide particles are modified through bonding of a functional group of a surface modifier which is a polydimethylsiloxane-skeleton polymer having one functional group at one terminal end thereof. Therefore, it is possible to obtain a transparent composite in which the dispersibility of inorganic oxide particles in a silicone resin is excellent, pores or cracks are not generated, and optical characteristics such as transparency or mechanical characteristics and thermal stability are excellent.

BEST MODE FOR CARRYING OUT THE INVENTION

The invention relates to a conjugated composition of inorganic oxide particles and a silicone resin, a method of manufacturing the same, a transparent composite, and a method of manufacturing the same. More specifically, the invention relates to a composite composition conjugated by treating inorganic oxide particles which are preferably used as a filler material of a silicone resin, and enable not only improvement of the refractive index and the mechanical characteristics but also maintenance of the transparency using a specific method and improving the compatibility of the inorganic oxide particles in the silicone resin, and a method of manufacturing the same, a transparent composite, and a method of manufacturing the same.

Hereinafter, an embodiment of a composite composition of inorganic oxide particles and a silicone resin, which is an embodiment of the invention, and an embodiment for carrying out a method of manufacturing the composite composition of inorganic oxide particles and a silicone resin, which is an embodiment of the invention, will be described.

Meanwhile, the embodiments are descriptions of specific examples for easier understanding of the purport of the invention, and do not limit the invention unless otherwise described. Addition, omission, substitution, and other variations are permitted within the scope of the purport of the invention. The invention is not limited by the following descriptions, and is limited only by the scope of the attached claims.

[Composite Composition]

The composite composition of the present embodiment is a composite composition containing inorganic oxide particles having an average dispersed particle diameter of 1 nm to 20 nm and a silicone resin, in which the surfaces of the inorganic oxide particles are modified through bonding of a functional group of a surface modifier which is a polydimethylsiloxane-skeleton polymer having one functional group at one terminal end thereof.

Here, the "composite composition" represents a composition which does not have a specific shape, has an irreversible deformability which does not allow returning to the original shape once deformed (changed), and serves as a raw material of a transparent composite described below. That is, the composite composition indicates, for example, a composition in a state of a liquid phase or a gel phase having a thixotropy nature. Conversely, the "transparent composite" described below refers to a composite which can maintain a constant shape in accordance with the purpose or method of use, and examples thereof include a composite in an ordinary solid phase which substantially does not have a deformability, a composite having an elastic deformability (shape-returning properties) such as rubber, and the like.

The inorganic oxide particles are not particularly limited, and examples thereof that can be used include oxides of elements such as zirconia (Zr), titanium (Ti), silicon (Si), aluminum (Al), iron (Fe), copper (Cu), zinc (Zn), yttrium (Y), niobium (Nb), molybdenum (Mo), indium (In), tin (Sn), tantalum (Ta), tungsten (W), lead (Pb), bismuth (Bi), cerium (Ce), antimony (Sb) and germanium (Ge).

Examples of the oxides of these elements include zirconium oxide ($ZrO_2$), titanium oxide ($TiO_2$), silicon oxide ($SiO_2$), aluminum oxide ($Al_2O_3$), iron oxide ($Fe_2O_3$, FeO, $Fe_3O_4$), copper oxide (CuO, $Cu_2O$), zinc oxide (ZnO), yttrium oxide ($Y_2O_3$), niobium oxide ($Nb_2O_5$), molybdenum oxide ($MoO_3$), indium oxide ($In_2O_3$, $In_2O$), tin oxide ($SnO_2$), tantalum oxide ($Ta_2O_5$), tungsten oxide ($WO_3$, $W_2O_5$), lead oxide (PbO, $PbO_2$), bismuth oxide ($Bi_2O_3$), cerium oxide ($CeO_2$, $Ce_2O_3$), antimony oxide ($Sb_2O_3$, $Sb_2O_5$), germanium oxide ($GeO_2$, GeO), and the like.

In addition, the inorganic oxide particles may be a composite oxide such as tin-doped indium oxide (ITO) or yttria-stabilized zirconia (YSZ). Particularly, in a case in which a composite composition with a silicone resin is made to have a high refractive index, it is possible to preferably use zirconium oxide ($ZrO_2$) or titanium oxide ($TiO_2$) which has a high refractive index, is colorless and transparent, and has a high hardness.

The average dispersed particle diameter of the inorganic oxide particles in the composite composition or a transparent composite obtained from the composite composition is preferably 1 nm to 20 nm.

Here, the reason for limiting the average dispersed particle diameter to 1 nm to 20 nm is that, when the average dispersed particle diameter is less than 1 nm, the primary particle diameter of particles that forms the dispersed particles also becomes less than 1 nm such that the crystallinity becomes insufficient, and it becomes difficult to express particle characteristics such as the refractive index. On the other hand, when the average dispersed particle diameter exceeds 20 nm, the influences of Rayleigh scattering become large, and the transparency of the composite composition or the transparent composite deteriorates.

As such, since the inorganic oxide particles are nanometer-sized particles, even in a case in which the inorganic oxide particles are dispersed in a silicone resin so as to produce a composite composition or a transparent composite, light scattering is small, and it is possible to maintain the transparency of the composite composition and the transparent composite.

The surfaces of the inorganic oxide particles are modified using a surface modifier which is a polydimethylsiloxane-skeleton polymer having one functional group at one terminal end. The surface modifier has a polydimethylsiloxane structure, particularly preferably a straight-chain polydimethylsiloxane structure, as the main chain skeleton, and has only one polar group which is a functional group at one terminal end (one end side) of the main chain. That is, there is no polar group at the other terminal end (the other end) of the main chain. Therefore, when the functional group (polar group) is selectively bonded to the surfaces of the inorganic oxide particles, the other end side, that is, the siloxane skeleton portion, which is a portion other than the functional group, forms a shape facing the outside of the particles (in a direction of getting away from the surfaces of the inorganic oxide particles) so that all siloxane skeleton portions face the outside. Since the siloxane structure portions and the silicone resin have a high compatibility, and also have a favorable affinity, it is possible to uniformly disperse the inorganic oxide particles in the silicone resin, and to forma favorable composite composition. Meanwhile, here, the "straight-chain" means that there is no branch (ramification) in the polydimethylsiloxane skeleton.

On the other hand, in a case in which there are branches (ramifications) in the siloxane skeleton, or the functional group is located in the middle of the siloxane skeleton (the functional group is bonded to silicon located in the middle of the siloxane structure), at least a part of the siloxane skeleton does not face in a direction of getting away from the surfaces of the inorganic oxide particles, and is liable to have a locational relationship in which a part of the siloxane structure faces in a direction toward the surfaces of the particles or is parallel to the surfaces of the particles. In this case, compared to a case in which the surface modifier composed of a straight-chain polydimethylsiloxane-skeleton polymer having one functional group at one terminal end is used, the amount of the siloxane structure facing the outside of the inorganic oxide particles decreases, and, consequently, there is a possibility that the compatibility or affinity may deteriorate between the inorganic oxide particles and the silicone resin. Furthermore, compared to a case in which the surface modifier composed of a straight-chain polydimethylsiloxane-skeleton polymer having one functional group at one terminal end is used, the uniformity in the direction of the siloxane skeleton is low, there is a possibility that entanglement or steric hindrance may occur between the siloxane structures, and there is a possibility that the compatibility or affinity may deteriorate between the inorganic oxide particles and the silicone resin.

In addition, since the surface modifier has one functional group and the functional group is used for bonding with the inorganic oxide particle, there is no unreacted functional group in the surface modifier which has been bonded to the inorganic oxide particles. Therefore, there is no possibility that deterioration of the compatibility with the silicone resin occurs, such as a phenomenon of cloudy, wherein such deterioration is caused by unreacted functional groups which are remained in a case in which a polyfunctional polysiloxane of the related art is used. Accordingly, it is possible to obtain a stabilized complex composition.

The surface modifier preferably includes one or two kinds selected from, for example, monoglycidyl ether-terminated polydimethylsiloxane and monohydroxy ether-terminated polydimethylsiloxane.

Among examples of terminal end groups of the polydimethylsiloxane-skeleton polymer having one functional group at one terminal end, which is the surface modifier, in the case of the monoglycidyl ether-terminal end, the epoxide portion which is a part of the glycidyl group thereof is ring-opened and bonds with the hydroxyl group on the surfaces of the inorganic oxide particle. In addition, in the case of the monohydroxy ether-terminal end, the hydroxyl group existing at the terminal end thereof bonds with the hydroxyl group existing on the surfaces of the inorganic oxide particles by dehydration condensation.

In examples of the surface modifier, the monoglycidyl ether-terminated polydimethylsiloxane originally contains no hydroxyl group, and the monohydroxy ether-terminated polydimethylsiloxane has only one hydroxyl group, which is a functional group that bonds with the inorganic oxide particle. Therefore, both surface modifiers do not have hydroxyl groups after being bonded to the surfaces of the inorganic oxide particles. Therefore, water is not generated as a result of a dehydration reaction, even when the composite composition is cured by a crosslinking reaction between polysiloxane of the surface modifier and the silicone resin, for example, even when the composite composition is cured by a crosslinking reaction which is caused by a dehydrogenation reaction, using a peroxide as a catalyst, between a methyl group ($-CH_3$) bonding to Si of a polysiloxane and a methyl group bonding to Si of the silicone resin. Therefore, there is no problem caused by water being generated. In addition, a transparent composite obtained in the above manner has a small shrinkage rate. Therefore, since pores or cracks are not generated in the transparent composite, and the dispersibility of the inorganic oxide particles in the cured silicone resin is favorably maintained, it is possible to obtain a defect-free transparent composite.

In the embodiment, the surfaces of the inorganic oxide particles can be modified so that the surface is suitable for improving the compatibility or dispersibility with respect to the silicone resin. Therefore, there is no particular limitation in the silicone resin, and an ordinary silicone resin can be used without any problem. Among silicone resins that can be used in the embodiment, particularly, a straight silicone resin or a modified silicone resin can be preferably used. Here, the "straight silicone resin" refers to a polymer (resin) in which a methyl group, a phenyl group, and/or a hydrogen atom are bonded to the polysiloxane skeleton as substituents. The "modified silicone resin" refers to a polymer obtained by secondarily bonding a functional group to the straight silicone resin so as to provide a function.

The reason for preferably using the straight silicone resin is that the straight silicone resin has no side chain and has a linear shape, and therefore has excellent mixing properties with the inorganic oxide particles. In addition, the reason why the modified silicone resin is preferable is that the modified silicone resin has excellent reactivity or crosslinking properties due to a functional group introduced thereto. However, depending on the kind or amount of the introduced functional group, there is a possibility that problems such as deterioration of the transparency of the obtained transparent composite may occur, due to the influences of byproducts generated in a case in which the silicone resin is cured, the amount of the byproducts or the like. Therefore, there are cases in which attention needs to be paid in selecting the modified silicone.

Examples of the straight silicone resin include a methyl silicone resin, a methyl phenyl silicone resin, and the like. In addition, examples of the modified silicone resin include an epoxy-modified silicone resin, an epoxy polyether-modified silicone resin, a carbinol-modified silicone resin, a methacryl-modified silicone resin, a phenol-modified silicone resin, a methyl styryl-modified silicone resin, an acryl-modified silicone resin, a methyl hydrogen silicone resin, and the like. The silicone resin may be selected solely or used in combination of two or more kinds.

Meanwhile, when the composite composition obtained by mixing the silicone resin, inorganic oxide particles, and the like is a composite composition which does not have a specific shape, has an irreversible deformability which does not allow returning to the original shape once deformed, for example, a characteristic of being present in a state of a liquid phase or a gel phase having a thixotropy nature, and is a raw material of a transparent composite described below, the silicone resin is not particularly limited. Therefore, the degree of polymerization of the silicone resin is not particularly limited.

That is, when the composite composition has the above characteristics, the silicone resin may be any of a monomer (monomer), an oligomer (a polymer obtained by polymerizing approximately 2 to several hundreds thereof), and a polymer (a polymer obtained by polymerizing several hundreds or more thereof). Furthermore, by combining the above, a substance having a certain range of the polymerization degree may be also used.

In addition, within the scope in which the characteristics thereof are not impaired, an antioxidant, a release agent, a coupling agent, an inorganic filler, and the like may be added to the silicone resin.

The content of the inorganic oxide particles in the composite composition is preferably 1% by mass to 90% by mass, more preferably 5% by mass to 90% by mass, and still more preferably 10% by mass to 85% by mass.

The reason for limiting the content of the inorganic oxide particles in the composite composition to 1% by mass to 90% by mass is as follows. That is, when the content is less than 1% by mass, since the amount of the inorganic oxide particles is too small, changes in the optical characteristics or mechanical characteristics of the silicone resin, which are caused by conjugation of the inorganic oxide particles, are not expressed. Therefore, there is no substantial effect of conjugating the inorganic oxide particles. On the other hand, when the content exceeds 90% by mass, it becomes impossible to sufficiently secure the dispersibility of the inorganic oxide particles, the fluidity of the composite composition deteriorates, and the moldability deteriorates.

In the composite composition of the embodiment, it is possible to add a hydrophobic solvent in addition to the inorganic oxide particles and the silicone resin.

The reasons why a hydrophobic solvent is added are as follows. First, in a case in which a mixture of the inorganic oxide particles and the silicone resin has a high viscosity, the fluidity of the mixture becomes poor, and therefore, problems may be caused wherein the moldability of the transparent composite described below becomes poor or properties of easy handling becomes poor. In order to solve the problems, a hydrophobic solvent can be solved to decrease the viscosity of the mixture. In addition, as described in the manufacturing method described below, a method is preferable in terms of properties of easy mixing, wherein inorganic oxide particles modified using a surface modifier are dispersed again in a hydrophobic solvent having a high compatibility with a silicone resin which is used, and the fluid dispersion of the inorganic oxide particles and the silicone resin are mixed and stirred, thereby obtaining a composite composition.

The reason why a hydrophobic solvent is used as the solvent and is suitable for the method of the embodiment is that such a solvent achieves suitable dispersibility of the surfaces treated inorganic oxide particles, and has excellent compatibility with the silicone resin.

Examples of the hydrophobic solvent that can be preferably used include aromatic hydrocarbon such as benzene, toluene, xylene, and ethylbenzene and chlorine-containing solvents such as dichloromethane, chloroform, and carbon tetrachloride. It is possible to use one or two or more of the solvents.

[Method of Manufacturing the Composite Composition]

In the method of manufacturing the composite composition of the embodiment, a specific dispersant is bonded in advance to the surfaces of inorganic oxide particles so as to provide a dispersibility in a hydrophobic solvent, and then the inorganic oxide particles are dispersed in a hydrophobic solvent. In addition, by substituting the specific dispersant bonded in advance to the surfaces of the inorganic oxide particles with a surface modifier composed of a polydimethylsiloxane-skeleton polymer having the monofunctional group at one terminal end in the hydrophobic solvent, the functional group of the surface modifier which is a polydimethylsiloxane-skeleton polymer having one functional group at one terminal end thereof is bonded to the surfaces of the inorganic oxide particles. After that, the obtained inorganic oxide particles having the surfaces modified through bonding of the polydimethylsiloxane-skeleton polymer having one functional group at one terminal end and the silicone resin are conjugated.

Hereinafter, the method of manufacturing the composite composition will be described according to the manufacturing sequence.

In the method of manufacturing the composite composition of the embodiment, in the beginning, a specific dispersant is bonded in advance to the surfaces of inorganic oxide particles so as to provide a dispersibility in a hydrophobic solvent.

The specific dispersant refers to a dispersant in which, in a case in which the inorganic oxide particles to which the specific dispersant is bonded can be easily dispersed in a hydrophobic solvent, and a surface modifier composed of a polydimethylsiloxane-skeleton polymer having one functional group at one terminal end is present together with the inorganic oxide particles to which the specific dispersant is bonded, the specific dispersant bonded in advance to the particles can be easily substituted with the surface modifier on the surfaces of the inorganic oxide particles. The specific dispersant is not particularly limited as long as the dispersant has the above properties, and an organic acid compound or an organic base compound may be used.

Here, examples of the organic acid compound include carboxylic acid, phosphoric acid, sulfonic acid, and the like, examples of the organic base compound include amine, phosphazene base, and the like, and the dispersant is appropriately selected based on the compatibility with the inorganic oxide particles.

Among the dispersants, a carboxylic acid or an amine is particularly preferably used. As the carboxylic acid, one or two or more kinds selected from, for example, saturated fatty acids such as formic acid, acetic acid, butyric acid, valeric acid, caproic acid, enanthic acid, caprylic acid, capric acid, lauric acid and stearic acid, and unsaturated fatty acids such as oleic acid may be used. In addition, as the amine, one or two or more kinds selected from, for example, aromatic amines such as pyridine and bipyridine, and aliphatic amines such as triethylamine, diethylamine, monoethylamine, and butylamine may be used.

The reason why the carboxylic acid or the amine is the preferably used dispersant is as follows.

Firstly, since the carboxylic acid or the amine can form a hydrogen bond with the surfaces of the inorganic oxide particles, the carboxylic acid or the amine is easily bonded to the inorganic oxide particles as long as only the carboxylic acid or the amine is present. In addition, the obtained inorganic oxide particles having the carboxylic acid or the amine bonded to the surfaces can hold dispersion stability in a hydrophobic solvent due to the presence of the carboxylic acid or the amine.

Meanwhile, in a case in which a substance having a larger bonding properties with respect to the inorganic oxide particles than the carboxylic acid or the amine, that is, a surface modifier which is a polydimethylsiloxane-skeleton polymer having one functional group at one terminal end is present, since the hydrogen bond between the inorganic oxide particles and the dispersant has a weak interaction, the carboxylic acid or the amine rapidly detaches from the inorganic oxide particles, and is substituted with the surface modifier.

For the above reasons, the carboxylic acid or the amine functions as a dispersant that disperses the inorganic oxide particles, and can be made to favorably detach during a reaction with the surface modifier, and therefore the carboxylic acid or the amine can be preferably used as the specific dispersant of the embodiment.

Next, the inorganic oxide particles having the specific dispersant bonded to the surfaces thereof are dispersed in a hydrophobic solvent.

Any solvent can be used as the hydrophobic solvent as long as the inorganic oxide particles are stably dispersed, and examples thereof include aromatic hydrocarbon such as benzene, toluene, xylene, and ethylbenzene; and chlorine-containing solvents such as dichloromethane, chloroform, and carbon tetrachloride. It is possible to use one or two or more kinds of the solvents.

Here, the reason for using the hydrophobic solvent is that favorable results can be obtained when the surface modifier which is a polydimethylsiloxane-skeleton polymer having one functional group at one terminal end is made to act on the inorganic oxide particles in the subsequent process.

Examples of a specific method for bonding the specific dispersant to the surfaces of the inorganic oxide particles so as to provide dispersibility in the hydrophobic solvent and dispersing the inorganic oxide particles in the hydrophobic solvent include the following method.

Examples thereof include a method in which tetragonal zirconia particles are used as the inorganic oxide particles, a hydrophobic solvent as a dispersion medium and the carboxylic acid which serves as the specific dispersant are added to and mixed with the zirconia particles, and then, a dispersion treatment is carried out using a wet mixing method such as ball milling or beads milling in which 0.05 mmφ to 1 mmφ zirconia beads are used. Using the above method, a treatment of the tetragonal zirconia particles using the carboxylic acid is carried out at the same time as dispersion of the tetragonal zirconia particles in the hydrophobic solvent, whereby a tetragonal zirconia dispersion fluid in which the carboxylic acid is bonded (hydrogen bond) to the surfaces of the particles can be prepared.

In addition, in a case in which silica (silicon oxide) is used as the inorganic oxide particles, amines are preferably selected, and butylamine is particularly preferably selected, as the specific dispersant.

Next, a surface modifier which is a polydimethylsiloxane-skeleton polymer having one functional group at one terminal end is added to the hydrophobic solvent in which the inorganic oxide particles are dispersed so as to substitute the surface modifier for the specific dispersant bonded in advance to the surfaces of the inorganic oxide particles, thereby bonding the surface modifier to the surfaces of the inorganic oxide particles so as to modify the surfaces.

The surface modifier preferably includes one or two kinds selected from monoglycidyl ether-terminated polydimethylsiloxane and monohydroxy ether-terminated polydimethylsiloxane.

The surface modifier has only one epoxy group or hydroxyl group, which is a functional group, at one terminal end. The functional group is a polar group, has a high affinity to the surfaces of the inorganic oxide particles which are polar, that is, hydrophilic, and can bond to the surfaces of the inorganic oxide particles which are polar, that is, hydrophilic. Meanwhile, the dispersion medium of the inorganic oxide particles is a hydrophobic solvent, has a low affinity to the functional group of the surface modifier, and does not react with the functional group of the surface modifier. Therefore, the functional group of the surface modifier and the surfaces of the inorganic oxide particles withdraw each other, and can be selectively bonded.

In addition, since the surface modifier has only one functional group, and the functional group is used for bonding with the inorganic oxide particles, there is no functional group present on the opposite side (the other end side of the surface modifier) of the functional group of the surface modifier, that is, the siloxane skeleton portion. In addition, the siloxane skeleton portion is hydrophobic, and has a high affinity to the hydrophobic solvent, but has little affinity to the inorganic oxide particles.

As such, by making the surface treatment agent react with the inorganic oxide particles in the hydrophobic solvent by using the surface modifier which is a polydimethylsiloxane-skeleton polymer having one functional group at one terminal end, the functional group (polar group) of the surface modifier is selectively oriented and bonded to the inorganic oxide particles, and the other end side is dispersed in the hydrophobic solvent, thereby forming a shape wherein the other end side is facing the outside of the inorganic oxide particles. Therefore, the functional group portion of the surface treatment agent bonds to the inorganic oxide particles, and the other end forms a shape in which the other end is separated from the inorganic oxide particles, so that the surface treatment agents are radially arranged.

Since the surface modifier modifies the surfaces of the inorganic oxide particles in the above manner, it becomes possible to modify a sufficient amount of the surface modifier on the surfaces of the inorganic oxide particles in order to provide compatibility to the silicone resin. In addition, the siloxane skeleton portion which exists at the other end of the surface modifier so that the siloxane skeleton portions are arranged radially away from the inorganic oxide particles, has a high compatibility with the silicone resin and favorable bonding properties. Due to the above facts, it is possible to uniformly disperse the inorganic oxide particles in the silicone resin and to form a favorable composite composition.

That is, it becomes possible to realize efficient modification of the surfaces of the inorganic oxide particles for the first time by using the surface modifier composed of a polydimethylsiloxane-skeleton polymer having one functional group at one terminal end and using the hydrophobic solvent.

Meanwhile, in a case in which a polyfunctional polysiloxane of the related art is used as the surface modifier, and a plurality of functional groups exist in a dispersed manner in the polysiloxane skeleton, the respective functional groups and the inorganic oxide particles bond to each other, and therefore a shape is formed in which the polysiloxane structure does not radially separated from the inorganic oxide particles, but attaches to the surfaces of the inorganic oxide particles. Therefore, it is difficult to provide a sufficient amount of the surface modifier on the surfaces of the inorganic oxide particles in order to provide compatibility to the silicone resin by modification. Furthermore, in an aspect of the molecular shape, since it is difficult to make all the functional groups face the surfaces of the inorganic oxide particles, unreacted functional groups remain on the surface modifier, and the compatibility with the silicone resin deteriorates. Therefore, it becomes difficult to uniformly disperse the inorganic oxide particles in the silicone resin.

In addition, in a case in which not one functional group but several functional groups are present at one terminal end of polysiloxane, it is difficult for all of the functional groups to reliably react with the surfaces of the metal oxide particles. Therefore, there is a possibility that unreacted functional groups, that is, the remaining of the polar groups may provide an adverse influence such as occurrence of gelation or a phenomenon in which a composite composition becomes clouded, in reference to the compatibility with the silicone resin which is hydrophobic.

Meanwhile, among examples of the functional group included in the surface modifier being used in the embodiment, that is, among examples of terminal groups, the monoglycidyl ether-terminal end bonds with the hydroxyl group existing on the surfaces of the inorganic oxide particles through ring-opening of the epoxide portion which is a part of the glycidyl group. In addition, the monohydroxy ether terminal end bonds with the surfaces of the inorganic oxide particles due to dehydration condensation of the hydroxyl group existing at the terminal end and the hydroxyl group existing on the surfaces of the inorganic oxide particles.

The aforementioned bonding reaction progresses as long as the surface modifier and the inorganic oxide particles coexist and are heated, but a catalyst may be added in order to facilitate the progress of the reaction. For example, in the case of the monoglycidyl ether-terminal end, it is possible to select a tin compound, a titanium compound, a zirconium compound, or the like as the catalyst for ring-opening of the epoxide portion. Similarly, also in the case of the monohydroxy ether-terminal end, it is possible to select, a tin compound, a titanium compound, a zirconium compound, or the like as the catalyst for dehydration condensation. The catalyst may be used solely or in combination of two or more kinds. Meanwhile, in a case in which a substance having a catalytic action of a tin oxide, a titanium oxide, a zirconium oxide, or the like is selected as the inorganic oxide particles, it is also possible to use the inorganic oxide particles as the alternative of the catalyst without using a catalyst.

Here, when bonding is performed between the functional group and the surfaces of the inorganic oxide particles, there are cases in which water is generated by dehydration reaction. As described below, water, which is generated during a crosslinking reaction for curing the silicone resin, may remain in the resin and cause problems in which a composite composition becomes clouded or the like. Therefore, such generation of water is not preferable. On the other hand, water, which is generated when the functional group of the surface modifier and the surfaces of the inorganic oxide particles are bonded in the hydrophobic solvent, can be readily removed outside the system, and problem is not caused in particular.

In addition, in the surface modifier, the monoglycidyl ether-terminated polydimethylsiloxane does not contain a hydroxyl group, and the monohydroxy ether-terminated polydimethylsiloxane has a hydroxyl group only as the functional group which bonds with the inorganic oxide particles. Therefore, after bonding to the surfaces of the inorganic oxide particles, both the surface modifiers have a molecular structure that does not contain a hydroxyl group.

Therefore, water is not generated by a dehydration reaction, and shrinkage of the obtained transparent composite is small, even when curing of the composite composition is made to progress due to the crosslinking reaction between the polysiloxane of the surface modifier and the silicone resin, such as, for example, a crosslinking reaction in which a methyl group ($-CH_3$) which bonds to Si of a polysiloxane and a methyl group which bonds to Si of the silicone resin are crosslinked through a dehydrogenation reaction using a peroxide as a catalyst. Therefore, since pores or cracks are not generated in the transparent composite, and the dispersibility of the inorganic oxide particles in the cured silicone resin is favorably maintained, it is possible to obtain a defect-free transparent composite.

It is preferable that the number average molecular weight of the polydimethylsiloxane-skeleton polymer having one functional group at one terminal end thereof, which is the surface modifier, is 500 to 10000, and more preferably 1000 to 8000.

Here, the reason for limiting the number average molecular weight of the polymer to 500 to 10000 is that, when the number average molecular weight of the polymer is less than 500, the amount of the siloxane skeleton portion which has hydrophobic property is small, and therefore it becomes difficult to make the inorganic oxide particles compatible with the silicone resin, and the transparency is not obtained when the inorganic oxide particles and the silicone resin are conjugated. On the other hand, when the number average molecular weight of the polymer exceeds 10000, the characteristics of the silicone resin is highly affected by the polymer, and the characteristics of the composite such as the refractive index deteriorate.

The mass ratio of the surface modifier to the inorganic oxide particles is preferably 5% by mass to 200% by mass with respect to the inorganic oxide particles, more preferably 5% by mass to 150% by mass, still more preferably 10% by mass to 100% by mass, and particularly preferably 20% by mass to 100% by mass.

Here, the reason for limiting the mass ratio of the surface modifier to 5% by weight to 200% by weight is that, when the mass ratio of the surface modifier is less than 5% by mass, the amount of the surface modifier is too small, and therefore it becomes difficult to make the metal oxide particles compatible with the silicone resin, and the transparency is not obtained when the inorganic oxide particles and the silicon resin are conjugated. On the other hand, when the mass ratio of the surface modifier exceeds 200% by mass, the ratio of the surface modifier in the composite composition or the transparent composite becomes too large to ignore, and therefore, the characteristics of the composite composition and the transparent composite are highly affected by the surface modifier, and there is a possibility that the characteristics deteriorate.

The surfaces modified inorganic oxide particles obtained in the above manner, which is modified by bonding with the surface modifier which is a polydimethylsiloxane-skeleton polymer having one functional group at one terminal end, is present together with the hydrophobic solvent which is a treatment solvent, the surface modifier remaining unreacted, the carboxylic acid or the amine which is the specific dispersant and is removed from the inorganic oxide particles through substitution, and the like.

Therefore, in order to obtain the target substance, the inorganic oxide particles are separated from the hydrophobic solvent and are washed using a suitable organic solvent or the like to remove the remaining surface modifier, the specific dispersant, and the like. Here, the organic solvent which is used for washing is a solvent which is used for removing the remaining surface modifier, the specific dispersant, and the like. Since the substances to be removed have polar groups, it is preferable that the organic solvent being used is not a fully hydrophobic solvent, but is a polar organic solvent having a certain degree of hydrophilicity.

Thus far, a method has been described in which the surface modifier which is a polydimethylsiloxane-skeleton polymer having one functional group at one terminal end is added to the hydrophobic solvent in which the inorganic oxide particles to which the specific dispersant is bonded are dispersed, and the surface modifier is substituted for the specific dispersant bonded in advance to the surface of the inorganic oxide to combining and modifying the surface modifier to the surfaces of the inorganic oxide particles. More specific examples of this method include a method in which the surface modifier which is of a polydimethylsiloxane-skeleton polymer having one functional group at one terminal end is added to a tetragonal zirconia dispersion fluid in which the carboxylic acid is coordinated on the surface thereof, furthermore, an appropriate amount of a catalyst is added, and a reflux treatment is carried out.

Here, the catalyst may be a tin compound, a titanium compound, a zirconium compound, and the like, and is appropriately selected.

After the reflux treatment, the inorganic oxide particles modified using the surface modifier are washed using an organic solvent, such as an alcohol, to remove unreacted surface modifier, carboxylic acid detached from the inorganic oxide particles, and the like to outside the system, and then the inorganic oxide particles are dried in a vacuum, whereby the inorganic oxide particles modified using the surface modifier can be obtained.

In the following process, the inorganic oxide particles having the surfaces modified through bonding of the surface modifier and the silicone resin are mixed, and the composite composition of the invention can be obtained.

Here, the silicone resin is not particularly limited, and any silicone resin can be used without any problem as long as the silicon resin is the above silicone resin. However, in particular, a straight silicone resin or a modified silicone resin can be preferably used.

The method of mixing the inorganic oxide particles modified using the surface modifier and the silicone resin is not particularly limited, and any conventionally known method, such as mixing, various millings, or application of ultrasonic waves, can be selectively used.

Here, the inorganic oxide particles modified using the surface modifier can be mixed in a particle state with the silicone resin, but it is preferable that the inorganic oxide particles be dispersed again in a hydrophobic solvent having a high compatibility with the silicone resin being used, and a dispersion fluid of the inorganic oxide particles and the silicone resin be mixed and stirred, thereby obtaining a composite composition. The reason is as follows. As compared to a method in which a solvent is used, a large effort is required in a method in which the inorganic oxide particles are directly added and dispersed in the silicone resin having a certain degree of viscosity so that the inorganic oxide particles are dispersed uniformly and particle agglomeration is prevented. On the other hand, a little effort is required in a method in which the inorganic oxide particles are added and dispersed in a hydrophobic solvent having a low viscosity, and a little effort is also required for mixing the obtained dispersion fluid and the silicone resin, since they are fluid.

In addition, in a case in which a mixture of the inorganic oxide particles modified using the surface modifier and the silicone resin has a high viscosity, there are cases in which problems of deterioration of the moldability of the transparent composite described below or deterioration of easy handling may occur due to poor fluidity. In order to prevent these problems, it is preferable that an appropriate solvent be added to a mixture of the inorganic oxide particles and the silicone resin so as to decrease the viscosity of the mixture. As the solvent being used here, a solvent in which the surfaces treated inorganic oxide particles are well dispersed, and with which the silicone resin has a high compatibility is suitable is preferably used, and therefore a hydrophobic solvent can be selected.

Examples of the hydrophobic solvent that can be preferably used include aromatic hydrocarbon such as benzene, toluene, xylene, and ethylbenzene and chlorine-containing solvents such as dichloromethane, chloroform, and carbon tetrachloride. It is possible to use one or two or more kinds of the solvents.

Accordingly, when the inorganic oxide particles and the silicone resin are mixed and stirred, it is possible to add the hydrophobic solvent at the same time that mixing and stirring of both components start or after mixing and stirring progresses to some extent.

As a specific method for mixing the silicone resin and the inorganic oxide particles modified using the surface modifier to obtain the composite composition, for example, a method can be cited wherein the washed, dried, and modified inorganic oxide particles is dispersed again in a hydrophobic solvent, the silicone resin is further added thereto, and mixing and stirring thereof are performed.

Furthermore, it is also possible to appropriately add the hydrophobic solvent to the obtained composite composition, and adjust the viscosity by mixing them using a mixer or the like, to produce a composite composition which is easy to flow and is suitably used for molding for forming a transparent composite.

It is possible to obtain the composite composition of the embodiment in the above manner.

Here, the average dispersed particle diameter of the inorganic oxide particles used in the method of manufacturing the composite composition of the embodiment is preferably 1 nm or more. The reason is that, when the average dispersed particle diameter is less than 1 nm, the primary particle diameter of particles that form the dispersed particles also becomes less than 1 nm and therefore the crystallinity becomes insufficient, and it becomes difficult to express particle characteristics such as the refractive index.

In addition, in a case in which the composite composition obtained using the method of manufacturing the composite composition of the embodiment needs to have transparency, the average dispersed particle diameter of the inorganic oxide particles being used is preferably 20 nm or less. The reason is that, when the average dispersed particle diameter exceeds 20 nm, the influences of Rayleigh scattering become large, and there is a possibility that the transparency of the composite composition deteriorates.

[Transparent Composite]

The transparent composite of the embodiment is a transparent composite, wherein inorganic oxide particles having an average dispersed particle diameter of 1 nm to 20 nm is dispersed in a silicone resin, and has a specific shape. The surface of the inorganic oxide particles are modified through bonding of one functional group of a surface modifier which is a polydimethylsiloxane-skeleton polymer having one functional group at one terminal end to said surface.

Here, the "having a specific shape" means that the transparent composite does not have an irreversible deformability such as those of a liquid phase, a gel phase, or the like, and can maintain a constant shape in accordance with the purpose or method of use. That is, this means that the transparent composite does not have fluid characteristics, and the transparent composite has a solid phase which, in general, does not substantially deform, or has an elastic deformability (shape-returning properties) of a rubber state or the like. The above expression does not mean the limitation of the shape.

Here, the transparent composite obtains a state having a specific shape by increasing the polymerization degree or the crosslinking degree of the silicone resin or increasing polymerization or the number of crosslinkings between the silicone resin and the siloxane structure of the surface modifier in the composite composition. Therefore, the respective components that constitute the transparent composite, that is, the two components which are the silicone resin and the inorganic oxide particles wherein the surfaces thereof has been modified by the surface modifier composed of a polydimethylsiloxane-skeleton polymer having one functional group at one terminal end are the same as the components of the above composite composition.

Meanwhile, the transparent composite basically does not include a hydrophobic solvent, and the amount is extremely small if the hydrophobic solvent is included in the composite.

Since the transparent composite has a high compatibility between the inorganic oxide particles and the silicone resin which form the transparent composite, and the affinity between both components is high, and the dispersibility of the inorganic oxide particles in the silicone resin is favorable. Therefore, there is no case in which optical characteristics, mechanical characteristics, thermal stability, and the like deteriorate due to the occurrence of phase separation between the inorganic oxide particles and the silicone resin or the occurrence of aggregation of the inorganic oxide particles, and therefore it is possible to maintain favorable characteristics.

In addition, no hydroxyl group remains in the surface modifier that modifies the inorganic oxide particles as described above. Due to the above fact, when the composite composition is cured when the transparent composite is formed, water is not generated due to a dehydration reaction during curing, and, furthermore, a shrinkage of the obtained transparent composite is small. Therefore, pores or cracks are not generated in the transparent composite. Additionally, since no chelating agent is used in the composite composition which is a material for forming the transparent composite, there is no possibility that the transparent composite is colored.

In addition, the average dispersed particle diameter of the inorganic oxide particles included in the transparent composite is 20 nm or less. Therefore, the occurrence of Rayleigh scattering, whose influences increase when the average dispersed particle diameter exceeds 20 nm, is suppressed at a low level, and there is no case in which the transparency of the transparent composite deteriorates.

As such, since the inorganic oxide particles are nanometer-sized particles of 20 nm or less, even in a case in which the inorganic oxide particles are dispersed in the silicone resin so as to produce the composite composition or an optical material, light scattering is small, and it is possible to maintain the transparency of the composite composition and the optical material.

On the other hand, the average dispersed particle diameter of the inorganic oxide particles included in the transparent composite is set to 1 nm or more. Therefore, it is also possible to set the primary particle diameter of particles that form the dispersed particles to 1 nm or more. Therefore, deterioration of the crystallinity of the particles is suppressed. Since the crystallinity of the inorganic oxide particles is maintained, the characteristics of the inorganic oxide particles, such as refractive index, hardness, and heat resistance, do not deteriorate, and thus it is possible to sufficiently obtain the effect of conjugating the inorganic oxide particles.

Here, examples of the effect of conjugating the inorganic oxide particles are as follows.

Firstly, as the optical characteristics, control of the refractive index of the transparent composite can be cited. Since the refractive index of the silicone resin is approximately 1.4, it is possible to increase the refractive index of the transparent composite by conjugating the particles of an oxide having a high refractive index of 1.8 or more. Particularly, it is effective to conjugate inorganic oxide particles having a high refractive index, such as tetragonal zirconium having a refractive index of 2.15 or titanium oxide having a refractive index of approximately 2.6. When these high-refractive index inorganic oxides are used, for example, it is possible to increase the refractive index of the transparent composite to approximately 1.5 to 1.65 which is approximately 0.1 to 0.2 higher than the refractive index of a silicone resin itself which is a base resin. Meanwhile, with regard to transparency, when the average dispersed particle diameter of the inorganic oxide particles is set to 20 nm or less as described above, occurrence of light scattering is sufficiently suppressed at a low level, and thus sufficient transparency is maintained.

Here, when low-refractive index particles such as hollow silica particles are conjugated, it is also possible to decrease the refractive index of the transparent composite.

Next, as the mechanical characteristics, improvement of the hardness of the transparent composite can be cited. Since an ordinary inorganic oxide has a higher hardness than the silicone resin, it is possible to increase the surface hardness of the transparent composite through conjugation of the inorganic oxide particles, and thus it is possible to improve abrasion resistance and improve the dimensional accuracy of the composite. Particularly, since zirconium oxide has a high hardness among oxide-based ceramics, conjugation of zirconium oxide highly improves the surface hardness.

In addition, since the silicone resin includes silicon (Si) in the skeleton structure thereof, the silicone resin is excellent in thermal stability or chemical stability such as heat resistance or chemical resistance compared to ordinary resins. Meanwhile, the heat resistance of an inorganic oxide is higher than that of the silicone resin, and it is also possible to achieve high chemical stability when a material of an inorganic oxide is selected. Accordingly, it is possible to further improve the thermal stability and chemical stability of the transparent composite through conjugating the inorganic oxide particles.

Here, as is evident from the fact that the silicone resin has a high compatibility with the hydrophobic solvent, the silicone resin has hydrophobic (water-repellent) properties. However, the silicone resin is highly flexible, and has a low vapor gas barrier properties compared to other resins. Here, in the transparent composite of the embodiment, the inorganic oxide particles having high gas barrier properties are uniformly dispersed in the transparent composite, and the bonding properties of the inorganic oxide particles with the silicone resin are high. Accordingly, conjugation of the inorganic oxide particles maintains the transparent composite in a state in which the hydrophobicity is high, and the vapor gas barrier properties are also high.

As such, when high-refractive index inorganic oxide particles, particularly, zirconium oxide is conjugated with the silicone resin, it becomes possible to increase the refractive index of the obtained transparent composite to, for example, approximately 1.5 to 1.65. Furthermore, since improvement of the hardness improves the dimension accuracy, the degree of freedom in the design of optical elements is improved. Therefore, for examples, it is possible for optical lenses to decrease the size and thickness, achieve integration, improve the light-collecting efficiency, reduce the wavelength dependency of the refractive index, and the like. Therefore, it is possible to expect the improvement in the characteristics of CCD or CMOS cameras and the like, which are devices using such optical elements, such as the achievement of the high resolution and the high sensitivity.

In addition, in a case in which the transparent composite is used as a sealing material of an LED which is a light-emitting element, since the transparent composite has a higher refractive index than a silicone resin itself which is a conventional sealing material component, it is possible to improve the conformity of the refractive index between the sealing material and a member having a high refractive index such as a light-emitting body and a substrate for forming a light-emitting body, which are covered with a sealing material, (the refractive index of a semiconductor material which is a light-emitting body of an LED is approximately 2.5, and the refractive index of a light-permeable substrate on which a film of a semiconductor material is formed is approximately 1.76). Therefore, internal reflection is reduced in a process of emitting light to outside from the light-emitting body of an LED.

Therefore, when the transparent composite of the embodiment is used for a sealing material of an LED, it can be expected that the light extraction efficiency of the LED is improved by approximately 10% to 15%, and it is possible to improve the brightness.

Furthermore, the transparent composite has high vapor gas barrier properties. Accordingly, it is possible to suppress the deterioration of light-emitting areas by suppressing the infiltration of moisture from outside, and extension of the service life of the light-emitting element can be expected.

In addition, in a case in which the transparent composite is used as a sealing material of an organic EL, since the water vapor gas barrier properties thereof are high, it is possible to suppress deterioration of light-emitting areas by suppressing infiltration of moisture from outside.

In addition, since the inorganic oxide particles in the transparent composite can effectively suppress the permeability of oxide gas, similarly, it is possible to suppress deterioration of light-emitting areas.

Therefore, expansion of the service life of a light-emitting element in an organic EL can be expected by using the transparent composite of the embodiment as a sealing material of the organic EL.

[Method of Manufacturing the Transparent Composite]

The transparent composite of the embodiment can be obtained by molding and solidifying the composite composition of the embodiment, specifically, into a specific shape. Here, the "molding and solidifying into a specific shape" means that the composite composition of the embodiment is not only put into a mold or the like and molded, but also is solidified while actions and conditions for increasing the degree of polymerization or the degree of crosslinking are provided to the silicone resin or the surface modifier in the simply molded composite composition. That is, the "molding and solidifying into a specific shape" means that a composite is formed which can maintain a constant shape which matches the purpose or method of use even after removed from the mold or the like. In addition, the "molding and solidifying into a specific shape" means that steps or contents for forming the composite can be included, and it should be understood that it is different from a simple process wherein the composite composition is merely put into a mold or the like to shape the composite composition.

In the present manufacturing method, in the beginning, the composite composition of the embodiment is molded using a mold such as a metal mold or is made to fill a vessel of a certain shape, thereby obtaining a molded body (a molded material and an filled material) formed into a desired shape as the transparent composite. The composite composition being used is preferably adjusted by adding a hydrophobic solvent or the like to have a suitable viscosity for molding, that is, to achieve a viscosity which is suitable for providing the composition to a mold.

Next, actions, conditions, and the like with which polymerization or crosslinking occurs to the silicone resin and the surface modifier included in the composite composition are provided to the molded body. The actions and conditions may be selected depending on necessity. Examples thereof include addition of temperature or heat, radiation of ultraviolet light or visible light, and the like. Due to the effect thereof, the degree of bonding (polymerization degree) between the silicone resins or between the silicone resin and the surface modifier increases. As a result, the molded body comes into a state in which a constant shape can be maintained even when an external force is added to the molded body after the molded body is removed from the mold or a vessel. Hereinafter, there are cases in which the above effects and actions are described as "curing" of the composite composition.

Here, in a case in which the silicone resin or the surface modifier has a reactive carbon double bond (C=C) in the skeleton structure thereof, there is a case in which polymerization or crosslinking progresses simply by mixing the silicone resin and the inorganic oxide particles having the surfaces modified and the composite composition is cured.

In addition, when a modified silicone resin having a polymerizable functional group is used as the silicone resin, and/or a polymerizable functional group is introduced in advance to the surface modifier which is bonded to the surfaces of the inorganic oxide particles (by denaturing the surface modifier using the functional group), it is also possible to cure the composite composition due to a reaction between functional groups of the silicone resins and/or between the functional group of the silicone resin and the functional group of the inorganic oxide particles having the modified surfaces. For example, an acryl modified silicone resin or an acryl modified surface modifier into which an acryl group, which is polymerized using ultraviolet rays (UV light), is introduced as a functional group is used. Thereby, polymerization between the silicone resins or bonding between the silicone resin and the surface modifier progresses by radiation of ultraviolet rays, and, consequently, curing of the composite composition becomes possible. The method of curing the composite composition using the functional group can be selected from a variety of methods depending on the kind of the functional group to be introduced. Typical examples thereof include a method in which a radical reaction initiated by heating or light radiation is used. According to the above method, it is possible to cure the composite composition using a (polymerization) reaction using heat, a (polymerization) reaction using ultraviolet rays or the like, a (polymerization) reaction using gamma (γ) rays, a combination of a plurality of the above methods, or the like.

In the method, adding a compound which generates radicals by heating or light radiation is also preferable.

However, in a case in which the reaction between the functional groups is used, there are cases in which byproducts generated by bonding are not compatible with the composite composition. Particularly, water generated by a dehydration reaction is not compatible with the composite composition. Therefore, there is a possibility that the byproducts turn into particles and are dispersed in the obtained transparent composite so as to deteriorate the transparency. Furthermore, there is another possibility that the byproducts deteriorate the bonding between the inorganic oxide particles and the surface modifier so as to cause aggregation of the inorganic oxide particles. In addition, in a case in which the amount of the byproducts is large, the obtained transparent composite significantly shrinks, and there is a possibility that pores or cracks are generated in the transparent composite.

Therefore, in the method of introducing the functional group into the silicone resin or the surface modifier, it is necessary to pay sufficient attention to the kind and amount of the functional group.

As a method of curing the composite composition by polymerization and a crosslinking reaction without using the polymerizable functional group, there is a method in which a crosslinking reaction is made to progress by radicals by adding a vulcanizing agent (crosslinking agent) such as a peroxide, and this method can be preferably used in the embodiment. In this reaction, for example, a methyl group ($-CH_3$) which bonds to Si in a polysiloxane of the surface modifier and a methyl group which bonds to Si in the silicone resin are bonded through dehydrogenation using a peroxide as a catalyst, and thus are crosslinking-bonded. The polymerization reaction between the silicone resins can be performed similarly.

According to this reaction, there is no case in which dehydration reaction-induced water is generated during the reaction, and there is a minor shrinkage of the obtained transparent composite. Therefore, pores or cracks are not generated in the transparent composite, and it is also possible to favorably maintain the dispersibility of the inorganic oxide particles in the cured silicone resin.

Particularly, the surface modifier used in the embodiment is an one functional group-type surface modifier, and, since the functional group has already been consumed for bonding with the inorganic oxide particles, there is no functional group present in the surface treatment agent bonded to the inorganic oxide particles, unless a particular treatment is carried out. Therefore, in the surface modifier used in the embodiment, that is, in the monoglycidyl ether-terminated polydimethylsiloxane, the monohydroxy ether-terminated polydimethylsiloxane, or the like, it is preferable that a crosslinking reaction be caused between the silicone resin and the surface treatment agent bonded to the inorganic oxide particles using a method wherein a dehydrogenation reaction is performed using the peroxide as a catalyst, thereby making the curing of the composite composition progress.

Examples of the vulcanizing agent used in this reaction include generally known organic peroxides. Examples thereof include benzoyl peroxide, 2,4-dichlorobenzoyl peroxide, dicumyl peroxide, parachlorobenzoyl peroxide, di-tert-butyl peroxide, tert-butyl perbenzoate, and the like. It is possible to use the vulcanizing agent solely or in combination of two or more kinds.

In the above manner, it is possible to obtain the defect-free transparent composite of the embodiment which has excellent optical characteristics, excellent mechanical characteristics, high thermal stability and high chemical stability.

Examples of the preferable embodiments according to the invention have been described above, but it is needless to say that the invention is not limited to the examples. The combinations and the like of the respective configurations shown in the above examples are simply examples, and a variety of modifications are permitted based on design requirements and the like within the scope of the purport of the invention.

For example, in the embodiment, since the method of manufacturing the composite composition has been described with an assumption of manufacturing the transparent composite, the average dispersed particle diameter of the inorganic oxide particles being used was preferably set to 1 nm to 20 nm. However, in a case in which it is not necessary to take transparency into account, it is also possible to use the inorganic oxide particles having an average dispersed particle diameter outside the above range. For examples, in a case in which an object is to improve the surface hardness of a molded body of the composite composition, it is also possible to use the inorganic oxide particles having an average dispersed particle diameter that is larger than 20 nm (for example, 100 nm). Even in such a case, it is possible to produce a composite composition which enables manufacturing of a molded body which has a high dispersibility of inorganic oxide particles in the composite composition and has favorable properties, by using the method of manufacturing the composite composition of the invention.

EXAMPLES

Hereinafter, the invention will be specifically described using Examples 1 to 7 and Comparative examples 1 to 5, but the invention is not limited to the examples.

Example 1

Manufacturing of Zirconium Oxide Particles

A zirconia precursor slurry was prepared by adding diluted ammonia water obtained by dissolving 344 g of 28% ammonia water (manufactured by Wako Pure Chemical Industries, Ltd.) in 20 L of pure water to a zirconium salt solution obtained by dissolving 2615 g of zirconium oxychloride octahydrate (manufactured by Wako Pure Chemical Industries, Ltd.) in 40 L (liters) of pure water while stirring the mixture.

Next, an aqueous solution of sodium sulfate obtained by dissolving 300 g of sodium sulfate (manufactured by Wako Pure Chemical Industries, Ltd.) in 5 L of pure water was added to the slurry while stirring the mixture. The amount of sodium sulfate added at this time was 30% by mass with respect to the zirconia-converted value of zirconium ions in the zirconium salt solution.

Next, the mixture was dried at 130° C. for 24 hours in the atmosphere using a drier so as to obtain a solid.

Next, the solid was grinded using an automatic mortar or the like, and then fired at 500° C. for one hour in the atmosphere using an electric furnace.

Next, the fired product was put into pure water, stirred into a slurry form, then, washed through repetition of a process of separating the supernatant liquid using a centrifugal separator, and sufficiently removing the added sodium sulfate. The fired product was washed until the conductivity of the supernatant liquid after centrifugal separation became 1 mS/cm or less, and the obtained sediment was dried in a drier, thereby preparing zirconium oxide particles.

As a result of measuring the primary particle diameter of the obtained zirconium oxide particles using a field emission type transmission electron microscope JEM-2100F (manufactured by JEOL Ltd.), the diameter was 3 nm.

(Bonding of the Surface Modifier to Zirconium Oxide Particles)

Next, 85 g of toluene (manufactured by Wako Pure Chemical Industries, Ltd.) as a hydrophobic solvent and 5 g of caproic acid (manufactured by Wako Pure Chemical Industries, Ltd.), which is a carboxylic acid, as a specific dispersant were added to and mixed with 10 g of the zirconium oxide particles, thereby bonding the caproic acid to the surfaces of the zirconium oxide particles. After that, a dispersion treatment was carried out so as to prepare a transparent dispersion fluid of zirconium oxide.

Next, 10 g of monoglycidyl ether-terminated polydimethylsiloxane (manufactured by Sigma-Aldrich Co. LLC.: the number average molecular weight 5000, shown by the following formula (1)) as the polydimethylsiloxane-skeleton polymer having one functional group at one terminal end, which is the surface modifier, and 1000 ppm of dibutyl tin dilaurate (manufactured by Wako Pure Chemical Industries, Ltd.) were added to 100 g of the transparent dispersion fluid of zirconium oxide, and a surface modifying treatment was carried out under heating and reflux.

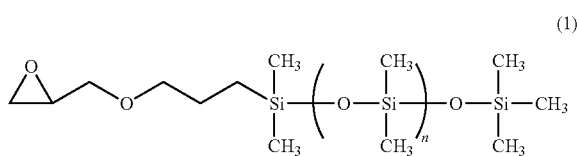

(1)

(In the above formula, n represents an integer of 60 to 70.)

The solvent was removed using an evaporator from the reacted transparent dispersion fluid of zirconium oxide, and then caproic acid detached from the zirconium oxide particles and unreacted monoglycidyl ether-terminated polydimethylsiloxane were removed by repeating methanol washing and centrifugal separation, thereby obtaining zirconium oxide particles modified by the surface modifier of Example 1. The obtained zirconium oxide particles modified by the surface modifier was 12 g.

(Manufacturing of a Zirconium Oxide-Silicone Resin Composite Composition)

12 g of the obtained zirconium oxide particles modified by the surface modifier was dispersed again in 50 g of toluene, 4 g of dimethyl silicone (manufactured by Shin-Etsu Chemical Co. Ltd.: KF96-3000cS), which is a straight silicone resin, was added, mixed, and stirred, thereby obtaining a zirconium oxide-silicone resin composite composition of Example 1.

(Evaluation of the Zirconium Oxide-Silicone Resin Composite Composition)

The obtained zirconium oxide-silicone resin composite composition of Example 1 was coated on a glass substrate at a thickness of 1 mm to produce a visible light transmittance measurement sample. In the measurement, a spectrophotometer V-570 (manufactured by JASCO Corporation) was used, the measurement wavelength range was 400 nm to 800 nm, and a glass substrate on which the composite composition was not coated was used as a comparison sample. The average value of the obtained transmittance was used as the visible light transmittance.

As a result, the visible light transmittance was 86%.

In addition, the particle size distribution of zirconium oxide in the obtained zirconium oxide-silicone resin composite composition of Example 1 was measured using a particle size distribution measurement apparatus (Microtrac 9340-UPA, manufactured by Nikkiso Co., Ltd.) to which the dynamic light scattering method is applied.

The volume average particle size (MV value) of the zirconium oxide was obtained using arithmetic average based on the obtained distribution result, and the value was used as the average dispersed particle diameter.

As a result, the average dispersed particle diameter was 4 nm.

(Manufacturing of a Zirconium Oxide-Silicone Resin Transparent Composite)

0.2 g of benzoyl peroxide (manufactured by Sigma-Aldrich Co. LLC.), which is a vulcanizing agent, was added to and dissolved through stirring in the obtained zirconium oxide-silicone resin composite composition of Example 1, then, the solution was made to flow into a mold formed with a glass substrate so as to have 1 mm thick, and heated at 120° C. for 30 minutes to be cured, thereby obtaining a zirconium oxide-silicone resin transparent composite of Example 1.

The content of zirconium oxide in the transparent composite was 38% by weight.

(Evaluation of the Zirconium Oxide-Silicone Resin Transparent Composite)

A cross-section of the obtained zirconium oxide-silicone resin transparent composite of Example 1 was observed using a field emission type transmission electron microscope JEM-2100F (manufactured by JEOL Ltd.) to measure the particle diameters of 100 particles, which were randomly selected, and the average value thereof was used as the average dispersed particle diameter of zirconium oxide in the zirconium oxide-silicone resin transparent composite.

As a result, the average dispersed particle diameter was 4 nm.

In addition, for the obtained zirconium oxide-silicone resin transparent composite of Example 1, the visible light transmittance was measured in the thickness direction (1 mm) in a similar manner to the composite composition using a spectrophotometer V-570 (manufactured by JASCO Corporation).

As a result, the visible light transmittance of the zirconium oxide-silicone resin transparent composite of Example 1 was 83%.

In addition, the obtained zirconium oxide-silicone resin transparent composite of Example 1 was held at 150° C. for 24 hours in the atmosphere, and whether yellowing occur was confirmed through visual observation.

As a result, yellowing did not occur.

Example 2

A zirconium oxide-silicone resin composite composition and a transparent composite of Example 2 were obtained in the same manner as in Example 1 except that the surface modifier of Example 1 was changed from the monoglycidyl ether-terminated polydimethylsiloxane to monohydroxy ether-terminated polydimethylsiloxane (manufactured by Sigma-Aldrich Co. LLC.: the number average molecular weight 4600, shown by the following formula (2)).

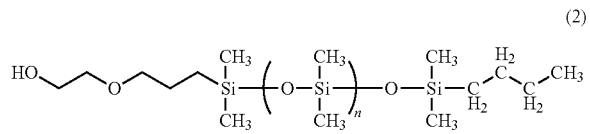

(2)

(in the above formula, n represents an integer of 60 to 70.)

The visible light transmittance and the average dispersed particle diameter of the obtained zirconium oxide-silicone resin composite composition of Example 2 were measured in the same manner as in Example 1. As a result, the visible light transmittance was 81%, and the average dispersed particle diameter was 5 nm.

In addition, as a result of measuring the average dispersed particle diameter of the obtained zirconium oxide-silicone resin transparent composite of Example 2 in the same manner as in Example 1, the average dispersed particle diameter was 6 nm. Furthermore, as a result of obtaining the visible light transmittance in the same manner as in Example 1, the visible light transmittance was 82%. Furthermore, after checking whether yellowing occurs in the same manner as in Example 1, yellowing did not occur.

Example 3

A zirconium oxide-silicone resin composite composition and a transparent composite of Example 3 were obtained in the same manner as in Example 1 except that the silicone resin of Example 1 was changed from dimethyl silicone to methyl phenyl silicone (manufactured by Shin-Etsu Chemical Co. Ltd.: KF54-400cS).

The visible light transmittance and the average dispersed particle diameter of the obtained zirconium oxide-silicone resin composite composition of Example 3 were measured in the same manner as in Example 1. As a result, the visible light transmittance was 84%, and the average dispersed particle diameter was 4 nm.

In addition, as a result of measuring the average dispersed particle diameter of the obtained zirconium oxide-silicone resin transparent composite of Example 3 in the same manner as in Example 1, the average dispersed particle diameter was 5 nm. Furthermore, as a result of obtaining the visible light transmittance in the same manner as in Example 1, the visible light transmittance was 82%. Furthermore, after checking whether yellowing occurs in the same manner as in Example 1, yellowing did not occur.

Example 4

A zirconium oxide-silicone resin composite composition and a transparent composite of Example 4 were obtained in the same manner as in Example 1 except that the silicone resin of Example 1 was changed from dimethyl silicone to acryl modified silicone (manufactured by Gelest, Inc.: DMS-V22, 200cS).

The visible light transmittance and the average dispersed particle diameter of the obtained zirconium oxide-silicone resin composite composition of Example 4 were measured in the same manner as in Example 1. As a result, the visible light transmittance was 88%, and the average dispersed particle diameter was 5 nm.

In addition, as a result of measuring the average dispersed particle diameter of the obtained zirconium oxide-silicone resin transparent composite of Example 4 in the same manner as in Example 1, the average dispersed particle diameter was 5 nm. Furthermore, as a result of obtaining the visible light transmittance in the same manner as in Example 1, the visible light transmittance was 85%. Furthermore, after checking whether yellowing occurs in the same manner as in Example 1, yellowing did not occur.

Example 5

A zirconium oxide-silicone resin composite composition and a transparent composite of Example 5 were obtained in the same manner as in Example 1 except that the silicone resin of Example 1 was changed from dimethyl silicone to methyl hydrogen silicone (manufactured by Shin-Etsu Chemical Co. Ltd.: KF99-20cS).

The visible light transmittance and the average dispersed particle diameter of the obtained zirconium oxide-silicone resin composite composition of Example 5 were measured in the same manner as in Example 1. As a result, the visible light transmittance was 82%, and the average dispersed particle diameter was 7 nm.

In addition, as a result of measuring the average dispersed particle diameter of the obtained zirconium oxide-silicone resin transparent composite of Example 5 in the same manner as in Example 1, the average dispersed particle diameter was 9 nm. Furthermore, as a result of obtaining the visible light transmittance in the same manner as in Example 1, the visible light transmittance was 80%. Furthermore, after checking whether yellowing occurs in the same manner as in Example 1, yellowing did not occur.

Example 6

Silicon dioxide (silica) particles (manufactured by Alfa-Aesar, the primary particle diameter: 10 nm) were used as the inorganic oxide particles. A silicon dioxide-silicone resin composite composition and a transparent composite of Example 6 were obtained using the same method as in Example 1 except that the silicon dioxide particles were used, and butyl amine (manufactured by Wako Pure Chemical Industries, Ltd.), which is an amine, was used as the specific dispersant.

The visible light transmittance and the average dispersed particle diameter of the obtained silicon dioxide-silicone resin composite composition of Example 6 were measured in the same manner as in Example 1. As a result, the visible light transmittance was 92%, and the average dispersed particle diameter was 13 nm.

In addition, as a result of measuring the average dispersed particle diameter of the obtained silicon dioxide-silicone resin transparent composite of Example 6 in the same manner as in Example 1, the average dispersed particle diameter was 16 nm. Furthermore, as a result of obtaining the visible light transmittance in the same manner as in Example 1, the visible light transmittance was 90%. Furthermore, after checking whether yellowing occurs in the same manner as in Example 1, yellowing did not occur.

Example 7

A silicon dioxide-silicone resin composite composition and a transparent composite of Example 7 were obtained in the same manner as in Example 6 except that the surface modifier of Example 6 was changed from monoglycidyl ether-terminated polydimethylsiloxane to monohydroxy ether-terminated polydimethylsiloxane (manufactured by Sigma-Aldrich Co. LLC.: the number average molecular weight 4600).

The visible light transmittance and the average dispersed particle diameter of the obtained silicon dioxide-silicone resin composite composition of Example 7 were measured in the same manner as in Example 1. As a result, the visible light transmittance was 90%, and the average dispersed particle diameter was 12 nm.

In addition, as a result of measuring the average dispersed particle diameter of the obtained silicon dioxide-silicone resin transparent composite of Example 7 in the same manner as in Example 1, the average dispersed particle diameter was 12 nm. Furthermore, as a result of obtaining the visible light transmittance in the same manner as in Example 1, the visible light transmittance was 88%. Furthermore, after checking whether yellowing occurs in the same manner as in Example 1, yellowing did not occur.

Comparative Example 1

Reference Example 1

Zirconium oxide particles (manufactured by Sigma-Aldrich Co. LLC.) having a primary particle diameter of 50 nm were used as the inorganic oxide particles. A zirconium oxide-silicone resin composite composition and a transparent composite of Comparative example 1 (Reference example 1) were obtained in the same manner as in Example 1 except that the zirconium oxide particles having a primary particle diameter of 50 nm were used.

The visible light transmittance and the average dispersed particle diameter of the obtained zirconium oxide-silicone resin composite composition of Comparative example 1 (Reference example 1) were measured in the same manner as in Example 1. As a result, the visible light transmittance was 11%, the composite composition became slightly turbid, and the average dispersed particle diameter was 78 nm.

In addition, as a result of measuring the average dispersed particle diameter of the obtained zirconium oxide-silicone resin transparent composite of Comparative example 1 (Reference example 1) in the same manner as in Example 1, the average dispersed particle diameter was 85 nm. Furthermore, as a result of obtaining the visible light transmittance in the same manner as in Example 1, the visible light transmittance was 12%. Furthermore, after checking whether yellowing occurs in the same manner as in Example 1, yellowing did not occur.

Comparative Example 2

A zirconium oxide-silicone resin composite composition and a transparent composite of Comparative example 2 were obtained in the same manner as in Example 1 except that the surface modifier was changed from monoglycidyl ether-terminated polydimethylsiloxane having only one functional group at one terminal end thereof to bishydroxy ether-terminated polydimethylsiloxane (manufactured by Sigma-Aldrich Co. LLC.: the number average molecular weight 5000) having a functional groups at both terminal ends respectively.

The visible light transmittance and the average dispersed particle diameter of the obtained zirconium oxide-silicone resin composite composition of Comparative example 2 were measured in the same manner as in Example 1. As a result, the visible light transmittance was 18%, and the average dispersed particle diameter was 56 nm.

In addition, as a result of measuring the average dispersed particle diameter of the obtained zirconium oxide-silicone resin transparent composite of Comparative example 2 in the same manner as in Example 1, the average dispersed particle diameter was 61 nm. Furthermore, as a result of obtaining the visible light transmittance in the same manner as in Example 1, the visible light transmittance was 16%. Furthermore, after checking whether yellowing occurs in the same manner as in Example 1, yellowing did not occur.

Comparative Example 3

A zirconium oxide-silicone resin composite composition and a transparent composite of Comparative example 3 were obtained in the same manner as in Example 1 except that the surface modifier was changed from monoglycidyl ether-terminated polydimethylsiloxane having only one functional group at one terminal end thereof to diglycidyl ether-terminated polydimethylsiloxane (manufactured by Sigma-Aldrich Co. LLC.: the number average molecular weight 5000) having one functional groups at both terminal ends respectively.

The visible light transmittance and the average dispersed particle diameter of the obtained zirconium oxide-silicone resin composite composition of Comparative example 3 were measured in the same manner as in Example 1. As a result, the visible light transmittance was 23%, and the average dispersed particle diameter was 34 nm.

In addition, as a result of measuring the average dispersed particle diameter of the obtained zirconium oxide-silicone resin transparent composite of Comparative example 3 in the same manner as in Example 1, the average dispersed particle diameter was 42 nm. Furthermore, as a result of obtaining the visible light transmittance in the same manner as in Example 1, the visible light transmittance was 22%. Furthermore, after checking whether yellowing occurs in the same manner as in Example 1, yellowing occurred.

Comparative Example 4

A zirconium oxide-silicone resin composite composition and a transparent composite of Comparative example 4 were obtained in the same manner as in Example 1 except that the surface modifier was changed from monoglycidyl ether-terminated polydimethylsiloxane having only one functional group at one terminal end thereof to disilanol-terminated polydimethylsiloxane (manufactured by Sigma-Aldrich Co. LLC.: the number average molecular weight 5300) having one functional groups at both terminal ends respectively.

The visible light transmittance and the average dispersed particle diameter of the obtained zirconium oxide-silicone resin composite composition of Comparative example 4 were measured in the same manner as in Example 1. As a result, the visible light transmittance was 21%, the average dispersed particle diameter was 51 nm, and aggregation of the particles was considered to occur.

In addition, as a result of measuring the average dispersed particle diameter of the obtained zirconium oxide-silicone resin transparent composite of Comparative example 4 in the same manner as in Example 1, the average dispersed particle diameter was 55 nm. Furthermore, as a result of obtaining the visible light transmittance in the same manner as in Example 1, the visible light transmittance was 15%. Furthermore, after checking whether yellowing occurs in the same manner as in Example 1, yellowing did not occur.

Comparative Example 5

Dimethyl silicone (manufactured by Shin-Etsu Chemical Co. Ltd.: KF96-3000cS), which is a straight silicone resin and was used as the silicone resin, which is singly used and does not include the inorganic oxide particles, and the visible light transmittance of the silicone resin (a viscous liquid-like) itself was measured in the same manner as in Example 1.

As a result, the visible light transmittance was 93%.

The above results are summarized and shown in Table 1.

Meanwhile, with regard to evaluation of yellowing, a case in which yellowing does not occur is given "O", and a case in which yellowing occurs is given "X".

The results of evaluation showed that the composite compositions of the respective examples had favorable characteristics in which the average dispersed particle diameter of the inorganic oxide particles was 20 nm or less, and the visible light transmittance was also 81% or more, which did not significantly decrease as compared with Comparative example 5 (93%) which was a comparison sample.

In addition, it was also found that the transparent composite of the respective examples have favorable characteristics in which the average dispersed particle diameter of the inorganic oxide particles was 20 nm or less, the visible light transmittance was also 81% or more which did not significantly decrease as compared with Comparative example 5 (93%) which was a comparison sample, and furthermore, yellowing did not occur after the heating treatment.

On the other hand, in Comparative example 1 (Reference example 1), the average dispersed particle diameter of the composite composition and the transparent composite did not significantly increase as compared with the primary particle diameter of the inorganic oxide particles. However, the visible light transmittance decreased. This is considered such that, because the primary particle diameter of the inorganic oxide particles is as large as 50 nm and the primary particle diameter itself is large, the particles were liable to aggregate as compared to small primary particles, and therefore the average dispersed particle diameter of the inorganic oxide particles in the composite composition and the transparent composite increased, and light scattering occurred.

In addition, in Comparative examples 2 to 4, the primary particle diameter of the inorganic oxide particles is as small as 3 nm; however, compared to this diameter, the average dispersed particle diameter in the composite composition and the transparent composite increased significantly to be 30 nm or more. Therefore, the visible light transmittance decreased. This is considered that because a substance having functional groups at both terminal ends was used as the surface modifier, it was not possible to sufficiently modify the surfaces of the inorganic oxide particles, the inorganic oxide particles in the silicone resin aggregated to increase the average dispersed particle diameter, and the visible light transmittance decreased as a result of light scattering.

Based on the above results, the availability of the invention was confirmed.

TABLE 1

| | Inorganic oxide particles | | Surface modifier | | | | Composite composition | | Transparent composite | | |
|---|---|---|---|---|---|---|---|---|---|---|---|
| | Material | Primary particle diameter | Material | Number average molecular weight | Functional group Number | Functional group Location | Silicone resin | Visible light transmittance (%) | Average dispersed particle diameter (nm) | Visible light transmittance (%) | Average dispersed particle diameter (nm) | Yellowing |
| Example 1 | Zirconium oxide | 3 | PDMS-MGE | 5000 | 1 | Single terminal end | Dimethyl silicone | 86 | 4 | 83 | 4 | o |
| Example 2 | Zirconium oxide | 3 | PDMS-MHE | 4600 | 1 | Single terminal end | Dimethyl silicone | 81 | 5 | 82 | 6 | o |
| Example 3 | Zirconium oxide | 3 | PDMS-MGE | 5000 | 1 | Single terminal end | Methyl phenyl silicone | 84 | 4 | 82 | 5 | o |
| Example 4 | Zirconium oxide | 3 | PDMS-MGE | 5000 | 1 | Single terminal end | Acryl modified silicone | 88 | 5 | 85 | 5 | o |
| Example 5 | Zirconium oxide | 3 | PDMS-MGE | 5000 | 1 | Single terminal end | Methyl hydrogen silicone | 82 | 7 | 80 | 9 | o |
| Example 6 | Silicon dioxide | 10 | PDMS-MGE | 5000 | 1 | Single terminal end | Dimethyl silicone | 92 | 13 | 90 | 16 | o |
| Example 7 | Silicon dioxide | 10 | PDMS-MHE | 4600 | 1 | Single terminal end | Dimethyl silicone | 90 | 12 | 88 | 12 | o |
| Comparative example 1 | Zirconium oxide | 50 | PDMS-MGE | 5000 | 1 | Single terminal end | Dimethyl silicone | 11 | 78 | 12 | 85 | o |
| Comparative example 2 | Zirconium oxide | 3 | PDMS-BHE | 5000 | 2 | Both terminal ends | Dimethyl silicone | 18 | 56 | 16 | 61 | o |
| Comparative example 3 | Zirconium oxide | 3 | PDMS-DGE | 5000 | 2 | Both terminal ends | Dimethyl silicone | 23 | 34 | 22 | 42 | x |
| Comparative example 4 | Zirconium oxide | 3 | PDMS-DSH | 5300 | 2 | Both terminal ends | Dimethyl silicone | 21 | 51 | 15 | 55 | o |

TABLE 1-continued

| Inorganic oxide particles | | Surface modifier | | | | Silicone resin | Composite composition | | Transparent composite | | Yellowing |
|---|---|---|---|---|---|---|---|---|---|---|---|
| | | | | Functional group | | | Visible light transmittance (%) | Average dispersed particle diameter (nm) | Visible light transmittance (%) | Average dispersed particle diameter (nm) | |
| Material | Primary particle diameter | Material | Number average molecular weight | Number | Location | | | | | | |
| Comparative example 5 | None | — | None | — | — | — | Dimethyl silicone | 93 | — | 93 | — | — |

Surface modifier material:
1. PDMS-MGE: monoglycidyl ether-terminated polydimethylsiloxane
2. PDMS-MHE: monohydroxy ether-terminated polydimethylsiloxane
3. PDMS-BHE: bishydroxy ether-terminated polydimethylsiloxane (Comparative example 2)
4. PDMS-DGE: diglycidyl ether-terminated polydimethylsiloxane (Comparative example 3)
5. PDMS-DSH: disilanol-terminated polydimethylsiloxane (Comparative example 4)

INDUSTRIAL APPLICABILITY

In the inorganic oxide particle-silicone resin composite composition of the embodiment, the compatibility between the inorganic oxide particles and the silicone resin is high, the inorganic oxide particles and the silicone resin are excellent in terms of conjugating properties, and coloration is prevented. Furthermore, in the transparent composite formed by molding and solidifying the present composite composition into a specific shape, it is possible to obtain a composite in which phase separation does not occur, pores or cracks are not generated, the transparency is excellent, and the optical characteristics, mechanical characteristics, and thermal stability are excellent.

Furthermore, it is possible to obtain a transparent composite having a high refractive index and a high transparency by selecting zirconium oxide, titanium oxide, or the like having a high refractive index as the inorganic oxide particles.

Therefore, the inorganic oxide particle-silicone resin composite composition and the transparent composite of the embodiment can be preferably used not only as sealing materials of light-emitting diodes (LED), optical sheets such as liquid crystal display substrates, organic EL display substrates, color filter substrates, touch panel substrates and solar cell substrates, transparent plates, optical lenses, optical elements, optical waveguides but also as elements in a variety of other industrial fields, and the availability of the embodiment is large.

We claim:

1. A composite composition comprising an inorganic oxide particle having an average dispersed particle diameter of 1 nm to 20 nm and a silicone resin,
   wherein one functional group of a surface modifier which is a polydimethylsiloxane-skeleton polymer having one functional group at one terminal end is bonded to the surface of the inorganic oxide particle to modify the surface,
   the polydimethylsiloxane-skeleton polymer has a straight-chain structure, and
   the surface modifier is at least one of monoglycidyl ether-terminated polydimethylsiloxane and monohydroxy ether-terminated polydimethylsiloxane.

2. The composite composition according to claim 1, wherein the silicone resin is a straight silicone resin or a modified silicone resin.

3. The composite composition according to claim 1, wherein the inorganic oxide particle is a particle made of a material selected from zirconium oxide, titanium oxide, silicon oxide, aluminum oxide, iron oxide, copper oxide, zinc oxide, yttrium oxide, niobium oxide, molybdenum oxide, indium oxide, tin oxide, tantalum oxide, tungsten oxide, lead oxide, bismuth oxide, cerium oxide, antimony oxide, germanium oxide, tin-doped indium oxide, and yttria-stabilized zirconia.

4. The composite composition according to claim 1, wherein a portion of the polymer other than the functional group is arranged so that the portion is radially away from the inorganic oxide particle.

5. A manufacturing method of a transparent composite, comprising: molding and solidifying the composite composition according to claim 1 to obtain the transparent composite.

6. A transparent composite, wherein an inorganic oxide particle having an average dispersed particle diameter of 1 nm to 20 nm is dispersed in a silicone resin, and
   the surface of the inorganic oxide particle is modified by bonding one functional group of a surface modifier, which is a polydimethylsiloxane-skeleton polymer having one functional group at one terminal end thereof, to the surface of the inorganic oxide particle, wherein
   the polydimethylsiloxane-skeleton polymer has a straight-chain structure, and
   the surface modifier is at least one of monoglycidyl ether-terminated polydimethylsiloxane and monohydroxy ether-terminated polydimethylsiloxane.

7. The transparent composite according to claim 6, wherein the inorganic oxide particle is a particle made of a material selected from zirconium oxide, titanium oxide, silicon oxide, aluminum oxide, iron oxide, copper oxide, zinc oxide, yttrium oxide, niobium oxide, molybdenum oxide, indium oxide, tin oxide, tantalum oxide, tungsten oxide, lead oxide, bismuth oxide, cerium oxide, antimony oxide, germanium oxide, tin-doped indium oxide, and yttria-stabilized zirconia.

8. The transparent composite according to claim 6, wherein a portion of the polymer other than the functional group is arranged so that the portion is radially away from the inorganic oxide particle.

* * * * *